United States Patent
Zahora et al.

(10) Patent No.: US 8,575,796 B1
(45) Date of Patent: Nov. 5, 2013

(54) HEAVY DUTY STATOR CORE AND COIL ASSEMBLY

(75) Inventors: Joseph A. Zahora, Oakwood, OH (US); Johnny D. Yu, Centerville, OH (US); Bradley S. Bryant, Xenia, OH (US)

(73) Assignee: Dayton-Phoenix Group, Inc., Dayton, OH (US)

( * ) Notice: Subject to any disclaimer, the term of this patent is extended or adjusted under 35 U.S.C. 154(b) by 585 days.

(21) Appl. No.: 12/713,957

(22) Filed: Feb. 26, 2010

(51) Int. Cl.
*H02K 1/04* (2006.01)
*H02K 15/12* (2006.01)

(52) U.S. Cl.
USPC ............... 310/45; 310/43; 310/214; 310/215

(58) Field of Classification Search
USPC ............... 310/214, 215, 216.004, 260, 43, 45
IPC .............................................. H02K 1/04,15/12
See application file for complete search history.

(56) References Cited

U.S. PATENT DOCUMENTS

| | | | |
|---|---|---|---|
| 4,160,926 A * | 7/1979 | Cope et al. | 310/215 |
| 4,263,475 A | 4/1981 | McNeal | |
| 4,291,455 A * | 9/1981 | Schnyder | 29/596 |
| 4,381,464 A * | 4/1983 | Schnyder | 310/45 |
| 4,588,916 A * | 5/1986 | Lis | 310/260 |
| 4,890,050 A * | 12/1989 | Mackevich | 322/34 |
| 5,319,269 A * | 6/1994 | Bryant | 310/43 |
| 5,680,692 A | 10/1997 | Kliman et al. | |
| 6,160,334 A * | 12/2000 | Teshima et al. | 310/67 R |
| 6,261,687 B1 | 7/2001 | Ryang et al. | |
| 6,596,393 B1 * | 7/2003 | Houston et al. | 428/389 |
| 6,787,948 B2 | 9/2004 | Peterson et al. | |
| 2003/0038555 A1 * | 2/2003 | Ozawa et al. | 310/154.02 |
| 2004/0178695 A1 * | 9/2004 | Kliman et al. | 310/254 |
| 2005/0012424 A1 * | 1/2005 | Irwin et al. | 310/215 |
| 2007/0299219 A1 | 12/2007 | Higashioji et al. | |
| 2008/0193637 A1 * | 8/2008 | Murray et al. | 427/117 |

OTHER PUBLICATIONS

"FCM—Flexible Composite Material" www.iec-international.com/fcm/fcm.htm (Dec. 2, 1998).
"Toshiba—Application Guideline #37," www.toshont.com/ag/mtrldesign/AG37EM.pdf (Mar. 6, 2009).
"GE's New Ultem* 5000B Film Offers High Performance, Cost-Effective Option for Range of Electrical/Electronic Applications," www.pressreleasefinder.com/item.asp?id=6857 (Nov. 20, 2006).
"Product Information—Ultem® Polyetherimide Resins SILTEM-STM1500," General Electric Plastics B.V., http://www.lani.gov/conferences/biw10/docs/siltem-stm1500.pdf (Feb. 7, 2002).
Marinescu, G.M. "Release 2.5 Insulating Solids Data in a Computerized Comprehensive On-line Numerical Data Base on Dielectric Materials," IEEE Xplore® Digital Library, http:ieeexplore.ieee.org/Xplore/login.jsp?url=/iel2/855/5322/00208200.pdf?arnumber=208200, from the Proceedings of the 19th Electrical Electronics Insulation Conference, Cicago, IL, Sep. 25-28, 1989.

* cited by examiner

*Primary Examiner* — Terrance Kenerly
(74) *Attorney, Agent, or Firm* — Thompson Hine L.L.P.

(57) ABSTRACT

A heavy-duty stator core and coil assembly that can accommodate severe input voltage spiking and harmonics may include a coat of varnish applied to the stator core and coil assembly by steps of dipping the stator core and coil assembly end-first along a longitudinal axis into a first tank of liquid epoxy resin having a relatively low viscosity, baking the coating, inverting the stator core and coil assembly and applying a second coat of varnish in the same manner, then dipping the core and coil assembly into a second tank having a liquid epoxy resin of a relatively high viscosity, then baking the second coat.

12 Claims, 2 Drawing Sheets

HEAVY DUTY STATOR CORE AND COIL ASSEMBLY

BACKGROUND

The present disclosure relates to dynamoelectric machines and, more particularly, stator core and coil assemblies thereof.

Dynamoelectric machines include alternating current (AC) induction motors having a stator and a rotor. The stator typically includes a stack of laminations formed and arranged in a substantially cylindrical shape having a plurality of longitudinally extending slots. Coils of wire, typically made of copper, are placed within the slots and connected to a source of alternating current. Magnetic fields created by the flow of alternating current through the coils induce magnetic fields in the adjacent rotor, causing the rotor to rotate about the center of the stator.

In one embodiment of such an AC induction motor, the stator is in the form of a cylinder positioned within and surrounded by a rotor in the form of a hollow cylinder. Such a design is useful in machines such as cooling fans, in which fan blades may be attached to and driven by the rotor.

AC induction motors often are utilized in harsh environments. One aspect of such harsh environments is that the alternating current to the stator is developed by an invertor and may include undesirable harmonics and voltage spikes. Such harmonics and voltage spikes cause the current flowing through the coils of the stator assembly to break through the electrical insulation material. This dielectric breakdown caused by voltage spikes and harmonics may create a partial discharge or a corona discharge. A partial discharge frequently begins at voids, cracks or inclusions within a solid dielectric, at conductor-dielectric interfaces within solid or liquid dielectrics, or in bubbles within liquid dielectrics. Partial discharges also may occur along the boundary between different insulating materials. Such partial discharges cause progressive deterioration of insulating materials, which may lead to electrical breakdown, shorting and damage to the stator components.

Accordingly, there is a need for a heavy duty stator core and coil assembly that exhibits superior resistance to partial discharge and corona discharge in response to an AC current having undesirable harmonics and voltage spikes.

SUMMARY

The disclosed stator core and coil assembly accommodates severe input voltages, spiking and harmonics. This is achieved by providing a stator core and coil assembly that includes a number of improvements that work together to reduce eddy current losses and corona discharges and partial discharges.

The disclosed heavy duty stator core and coil assembly may include a plurality of stacked laminations, each of which is first annealed, then coated on a side by spraying with a rust and corrosion inhibitor to reduce eddy current losses within the core. The core may include a plurality of slot liners, arranged in nested pairs in each of the slots. The slot liners may be made of a laminate of a sheet of an aramid polymer bonded to and between sheets of polyetherimide. The windings may include conductive wire coated with a modified polyester basecoat and a polyamideimide topcoat. Each of the windings may include insulating sleeving covering the first and second parallels thereof. Pairs of H-shaped insulators may be positioned between each coil to reduce insulation breakdown resulting from corona discharge.

Further, aspects of the stator core and coil assembly may include a varnish coating that minimizes any voids or contact with ambient air. The coating may be applied in a series of dip and bake steps. The stator core and coil assembly is dipped, end-first, into a tank of an epoxy resin having a relatively low viscosity, then that coating is baked, the core is then inverted and dipped a second time in the tank of epoxy resin and that second coating is baked. The core is then inverted again and dipped end-first in a second tank of epoxy resin having a relatively higher viscosity. The high-viscosity coating is then baked on.

Other aspects of the disclosed heavy duty stator core and coil assembly will be apparent from the following description, the accompanying drawings and the appended claims.

DETAILED DESCRIPTION

Figure 1:
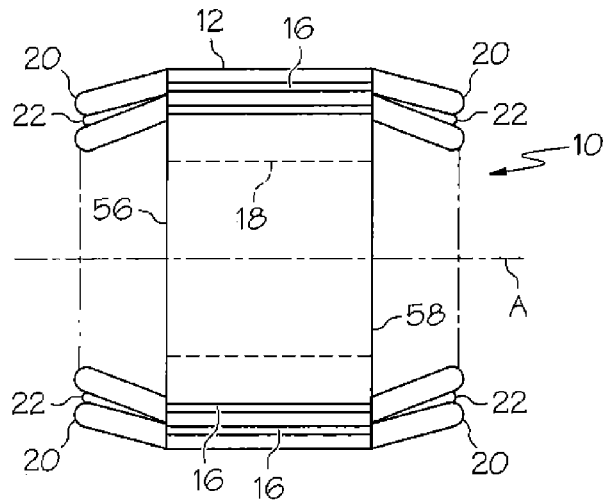
FIG. 1 is a side elevation of the disclosed heavy duty stator core and coil assembly.

As shown in FIG. 1, the heavy duty stator core and coil assembly, generally designated 10, may include a core 12 made of a stack of individual laminations 14 (see FIG. 2) shaped and arranged to form a plurality of slots 16 evenly spaced about the outer periphery of the core. The core 12 is generally cylindrical in shape having a central axis A and an inner peripheral wall 18. The slots are substantially parallel to each other and to the central axis A.

The slots 16 may receive multiple coils 20 of magnetic wire (see also FIG. 4) that are separated by paper insulators 22. The paper insulators 22 may be of conventional design, such as the insulators shown in U.S. Pat. No. 4,263,475, the disclosure of which is incorporated herein by reference. The insulators 22 may be H-shaped such that the connecting portions thereof (not shown) extend along the slots 16 and the substantially rectangular end portions protrude from the ends 56, 58 of the core 12. The insulators 22 may be used in pairs so that two insulators are adjacent each other and positioned between each coil 20 of the core. The double thickness of the paper insulators 22 reduces the risk of high volts per coil failure resulting from spikes in harmonics in the input AC voltage and extends the life of the adjacent insulation of the coils 20 that might otherwise break down as a result of electrical corona.

Figure 2:
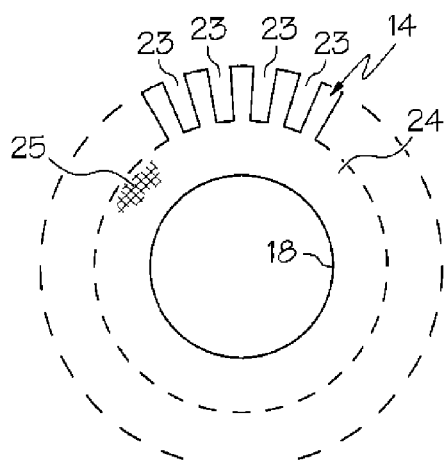
FIG. 2 is a top plan view of a typical lamination of the stator core and coil assembly of FIG. 1.

FIG. 2 shows a typical lamination 14 of the stack of laminations comprising the stator core 12 shown in FIG. 1. Each stator lamination 14 includes a plurality of notches 23 that extend radially outwardly from the center of the lamination. The notches 23 of each lamination may combine to form the slots 16 of the stator core 12. The laminations 14 may be made from steel that is first annealed, then coated on a side 24 with an insulator. The annealing preferably may be performed at a temperature of between approximately 1530° F. and 1560° F. for approximately one hour in an atmosphere of 6.5-8.5% CO, 6.0-9.0% $CO_2$ and 7.0-9.0% $H_2$ with a furnace specific gravity reading of 0.95. Annealing is desirable as it allows the steel lamination 14 to be magnetized.

After the lamination 14 is annealed, an insulation layer may be sprayed on to provide uniform thickness and coverage. Preferably, the layer is made of a coating of an organic material. For example, the coating may be propylene glycol methyl ether acetate, such as the Lamination and Metal Coater spray sold by John C. Dolph Company of Monmouth Junction, N.J. Preferably, one surface 24 of the lamination 14 is given a coat 25 of the aforementioned insulation. The benefit of the coating 25 is that it cuts down on the eddy current losses between the laminations. In addition, the coating reduces the stator iron losses due to the high transient frequencies from the incoming AC voltage.

Figure 4:
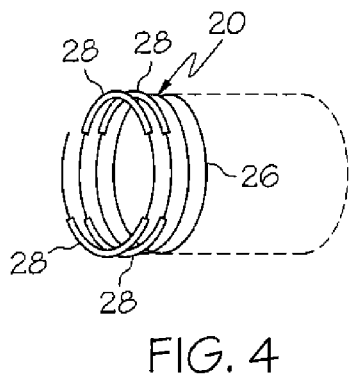
FIG. 4 is a schematic, perspective view of a coil of the stator core and coil assembly of FIG. 1 showing insulating sleeves positioned on the first and second turns of the parallels of the coil.

As shown in FIG. 4, the coil 20 of the stator core and coil assembly 10 may be comprised of inverter duty magnet wire 26. Such magnet wire is made up of a copper wire coated with a modified polyester base coat and a polyamideimide topcoat. An example of such inverter duty wire is the Essex® Ultrashield® Plus Magnet Wire manufactured by Essex Group, Inc. of Fort Wayne, Ind. Such coated magnet wire increases the breakdown threshold of the insulation resulting from voltage spikes present in invertor duty applications.

Also, as shown in FIG. 4, the coils 20 of the core and coil assembly 10 include insulating sleeves 28 positioned on the first and second turns of each parallel of each coil 20. The insulating sleeves protect the portion of the coil protruding from the core 12 (see FIG. 1). The sleeves 28 are limited to the first and second turns because those turns will see a higher voltage spike than the rest of the coil. Any voltage spikes are dampened out in the remaining turns due to inductance.

Figure 3:
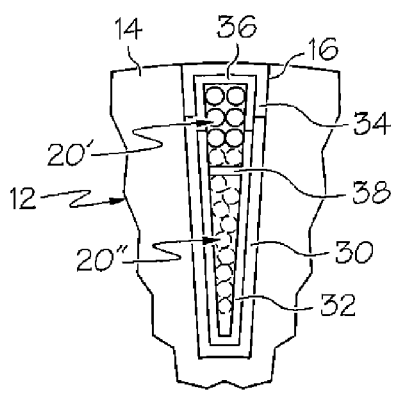
FIG. 3 is a detail showing the wire and slot liner positioned within a slot of the stator core and coil assembly of FIG. 1.

As shown in FIG. 3, each slot 16 of the core 12 may include elongate slot liners 30, 32 and elongate top sticks 34, 36. The slot 16 may include a center stick or divider 38 to separate coils. The slot liners 30, 32 are nested relative to each other, as are the top sticks 34, 36. The center stick 38 separates coils 20' and 20" from each other within the slot 16. Each slot liner 30, 32 and each top stick 34, 36 may comprise an insulating paper made with films of thermoplastic polyetherimide bonded to both sides of paper made from two fibrous forms of an aromatic polyamide, preferably a short fiber (floc) and smaller fibrous binder particles (fibrids). The films of thermoplastic polyetherimide may be bonded to the paper made of the aromatic polyamide by a polyester resin. An example of a suitable thermoplastic polyetherimide is GE Ultem® 1000 available from General Electric Company. A suitable paper is DuPont 410 NOMEX® available from EI DuPont de Nemours and Co. The advantage of using nested slot liners 30, 32 and top sticks 34, 36 is that the combination reduces the chances of the associated windings 20', 20" grounding against the iron of the core 12. The combination also delays insulation breakdown that might occur if a corona is present. In one aspect, each of the liners 30, 32 and top sticks 34, 36 comprise a central paper of NOMEX 410 that is 0.005 inches thick bonded between films of Ultem 1000, each 0.002 inches thick.

Figure 5:
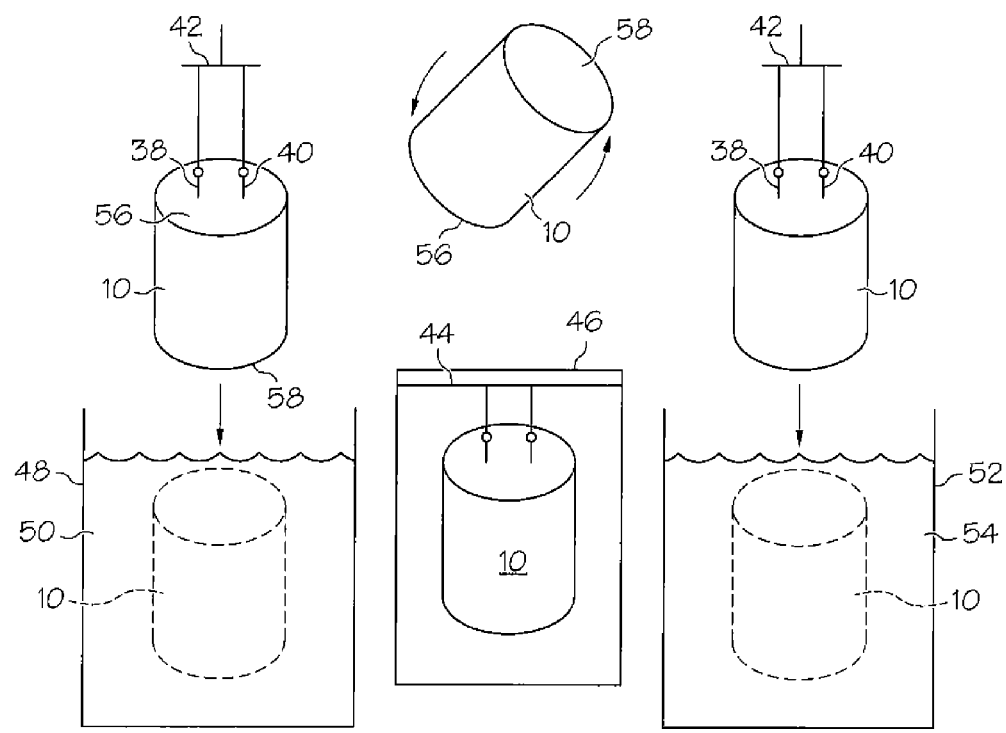
FIG. 5 is a schematic representation of a dip and bake process applied to the stator core and coil assembly of FIG. 1.

As shown in FIG. 5, the stator core and coil assembly may be encased within multiple layers of a varnish applied by a dip and bake process. Initially, the surfaces and components of the core 10 that are not to be coated with varnish are masked with grease. For example, the inside diameter 18 (see FIGS. 1 and 2) of the core 10 is masked with grease. As shown in the left-hand portion of FIG. 5, the core 10 is oriented in a vertical position such that the axis A (FIG. 1) is substantially vertical and end 56 is above end 58. Eyebolts are attached to the core 10 so that the core may be suspended from a hoist 42.

The core may be placed on or suspended from a rack 44 within an oven 46 and preheated for approximately 4 hours at 335° F. Next, the core and coil assembly 10 may be removed from the oven 46 and permitted to cool to approximately 105° F.-115° F. The core and coil assembly 10 may then be suspended from the hoist 42 above a tank 48 having an epoxy resin or varnish 50 having a relatively low viscosity. For example, the varnish 50 may be a single component epoxy insulating varnish having a viscosity of approximately 3000-7000 cps at 25° C.—2 RPM, 1500-3500 cps at 25° C.—20 RPM.

The core and coil assembly 10 may be dipped end-first into the tank 48 and is completely immersed in that orientation for approximately 15-20 minutes. The core and stator assembly 10 may then be raised from the tank by the hoist 42 and excess epoxy resin is allowed to drain from the core back into the tank 48. The now-coated core and coil assembly 10 may then placed in the oven 46 on or suspended from the rack 44 and baked for approximately 6 hours at approximately 335° F.

After the second baking step, the core 10 may be cooled to approximately 105° F.-115° C. The core 10 may then be reattached to the hoist 42 but inverted in orientation above the tank 48, so that end 58 of the core for the first dipping process is now above end 56. The hoist 42 may then lower the now-inverted core and coil assembly 10 into the tank 48 and a second coating of varnish is applied in the same manner as described previously. The core 10 may then removed from the tank and undergoes a third baking step for approximately 6 hours as previously described.

After the third baking step is completed, the core and coil assembly may be removed from the oven 46 and allowed to cool to approximately 105° F.-115° F., the coil assembly 10 may again be inverted, attached at eyebolts 38, 40 to hoist 42, placed over a second tank 52 having an epoxy resin of a relatively higher viscosity and lowered until the core and coil assembly 10 is completely immersed within the liquid epoxy resin 54. The core and coil assembly 10 may reside in the tank 54 for approximately 10-15 minutes, then raised and excess epoxy resin 54 allowed to drain from the core and coil assembly. A useful epoxy resin may be a single component epoxy insulating varnish having a viscosity of approximately 10,000-14,000 CPS at 25° C.—2 RPM, 3000-5000 CPS at 25° C.—20 RPM.

The core and coil assembly 10 may then be baked a fourth time in oven 46 for approximately 6 hours at approximately 335° F.

The benefits of the aforementioned dip and bake process are that the low viscosity or "thin" varnish will wick deeper into the slots in the stator pack, and the higher viscosity or "thicker" varnish will provide greater protection for the end turns of the coils 20. The varnish coats in addition protect the coils 20 from impact and further minimize any vibration. By filling the voids and cracks between the components of the stator core and coil assembly, locations where a corona may occur are reduced.

The combination of components described above work together to increase the partial discharge inception voltage (PDIV) that the stator core and coil assembly might otherwise withstand. Further, the life and reliability of a motor or dynamoelectric machine incorporating the aforementioned stator core and coil assembly will have an increased life and reliability.

While the forms of apparatus described herein may constitute preferred embodiments of the disclosed stator core and coil assembly, the invention is not limited to the aforementioned embodiments, and changes may be made therein without departing from the scope of the invention.

What is claimed is:

1. A heavy duty stator core and coil assembly that can accommodate severe input voltage spiking comprising:

a core made up of a plurality of stacked laminations, said core being substantially cylindrical in shape and having a central bore and a plurality of longitudinally extending slots formed in an exterior surface thereof;

a plurality of elongate slot liners, said slot liners arranged in nested pairs and each of said nested pairs being positioned in a different one of said slots; and a plurality of coils of conductive wire being positioned in said slots and spaced from said core by said nested pairs of said slot liners;

wherein each of said laminations is made by a process including a step of first annealing said lamination, then coating a side of said lamination by spraying with a rust and corrosion inhibitor, whereby eddy current losses between said laminations is reduced;

a coat of varnish covering said exterior surface of said stator core and coil assembly, wherein said coat of varnish is applied to said stator core and coil assembly by the steps of (a) dipping said stator core and coil assembly vertically downwardly end-first along a longitudinal axis thereof into a first tank having a liquid epoxy resin of a relatively low viscosity and removing said stator core and coil assembly therefrom such that said stator coil is coated with a first, relatively thin coat of epoxy resin;

(b) allowing said first coat to dry;

(c) dipping said stator core and coil assembly end-first along a longitudinal axis thereof into a second tank having a liquid epoxy resin of a relatively high viscosity and removing said stator therefrom such that said stator coil is coated with a second, relatively thin coat of epoxy resin; and (d) allowing said second coat to dry.

2. The assembly of claim 1 wherein said step (c) includes inverting said stator such that an opposite end thereof enters said second tank first.

3. The assembly of claim 1 wherein step (b) includes baking said stator core and coil assembly at a first temperature above ambient.

4. The assembly of claim 3 wherein step (d) includes baking said stator core and coil assembly at a second temperature above ambient.

5. The assembly of claim 3 wherein said at least said first temperature is at least approximately 335° F.

6. The assembly of claim 5 wherein said second temperature is at least approximately 335° F.

7. The assembly of claim 6 wherein said steps (b) and (d) include baking for at least six hours at said first and said second temperatures, respectively.

8. The assembly of claim 7 including a further step (e) of dipping said stator core and coil assembly end-first along a longitudinal axis thereof into said second tank a second time.

9. The assembly of claim 8 wherein said step (e) includes inverting said stator such that an opposite end thereof enters said second tank first.

10. The assembly of claim 9 including a further step (f) of baking said stator core and coil assembly subsequent to said dipping said stator core and coil assembly said second time.

11. The assembly of claim 10 wherein said baking step (f) includes baking said stator and coil assembly at a temperature of at least approximately 335° F. for approximately six hours.

12. A heavy duty stator core and coil assembly that can accommodate severe input voltage spiking comprising:

a core made up of a plurality of stacked laminations, said core being substantially cylindrical in shape and having a central bore and a plurality of longitudinally extending slots formed in an exterior surface thereof;

a plurality of elongate slot liners positioned in said slots;

a plurality of coils of conductive wire being positioned in said slots and spaced from said core by said slot liners; and a coat of varnish covering an exterior surface of said stator core and coil assembly, wherein said coat of varnish is applied to said stator core and coil assembly by the steps of (a) dipping said stator core and coil assembly vertically downwardly end-first along a longitudinal axis thereof into a first tank having a liquid epoxy resin of a relatively low viscosity and removing said stator core and coil assembly therefrom such that said stator coil is coated with a first, relatively thin coat of epoxy resin;

(b) allowing said first coat to dry;

(c) dipping said stator core and coil assembly end-first along a longitudinal axis thereof into a second tank having a liquid epoxy resin of a relatively high viscosity and removing said stator therefrom such that said stator coil is coated with a second, relatively thin coat of epoxy resin; and (d) allowing said second coat to dry.

* * * * *

UNITED STATES PATENT AND TRADEMARK OFFICE
CERTIFICATE OF CORRECTION

| | | |
|---|---|---|
| PATENT NO. | : 8,575,796 B1 | Page 1 of 1 |
| APPLICATION NO. | : 12/713957 | |
| DATED | : November 5, 2013 | |
| INVENTOR(S) | : Zahora et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this
Third Day of March, 2015

Michelle K. Lee
*Deputy Director of the United States Patent and Trademark Office*